United States Patent [19]

Maxwell

[11] 3,971,035
[45] July 20, 1976

[54] THERMOGRAPH WITH REMOVABLE CARTRIDGE

[75] Inventor: William H. Maxwell, West Los Angeles, Calif.

[73] Assignee: Cargo Graphics Corporation

[22] Filed: May 17, 1974

[21] Appl. No.: 470,901

[52] U.S. Cl. .......................... 346/33 TP; 73/343.5; 206/305; 206/523
[51] Int. Cl.² ..................... G01D 9/10; G01K 5/70; B65D 85/38
[58] Field of Search ............... 73/343.5, 362.8, 430; 346/33 TP, 136, 33 R; 53/36; 206/523, 305; 220/9 F

[56] References Cited
UNITED STATES PATENTS

| | | | |
|---|---|---|---|
| 2,516,124 | 7/1950 | Kishibay | 206/523 X |
| 2,937,820 | 5/1960 | Wilson | 346/136 X |
| 3,138,100 | 6/1964 | Peschko | 53/36 X |
| 3,157,303 | 11/1964 | Siegel | 73/362.8 X |
| 3,204,385 | 9/1965 | De Remer et al. | 53/36 X |
| 3,251,460 | 5/1966 | Edmonds | 206/523 |
| 3,404,945 | 10/1968 | Barter et al. | 346/33 R |
| 3,436,967 | 4/1969 | Post | 73/430 |
| 3,520,769 | 7/1970 | Baker | 206/523 |
| 3,540,284 | 11/1970 | Sellers et al. | 73/362.8 |
| 3,787,885 | 1/1974 | Johnson | 346/33 TP X |
| 3,848,735 | 11/1974 | McGee et al. | 206/523 |
| 3,868,697 | 2/1975 | Schefe | 73/343.5 X |

FOREIGN PATENTS OR APPLICATIONS 692,944   8/1964   Canada .......................... 346/33 TP Primary Examiner—Richard C. Queisser
Assistant Examiner—Daniel M. Yasich

[57] ABSTRACT

A time temperature recording device especially adapted to the business of transporting perishables and characterized by a preloaded returnable instrument of permanent nature packaged in a protective liner held secure and warranted by a sealed box that is expendible, with separate access openings for exclusive use of shipper and receiver respectively, and wherein a logic means permits depression of a stylus onto a pressure sensitive chart when instrument operation is started by the shipper, and lifts said stylus and releases said chart when stopped by the receiver. The used instrument is especially adapted to be returned by the Postal Service.

3 Claims, 12 Drawing Figures

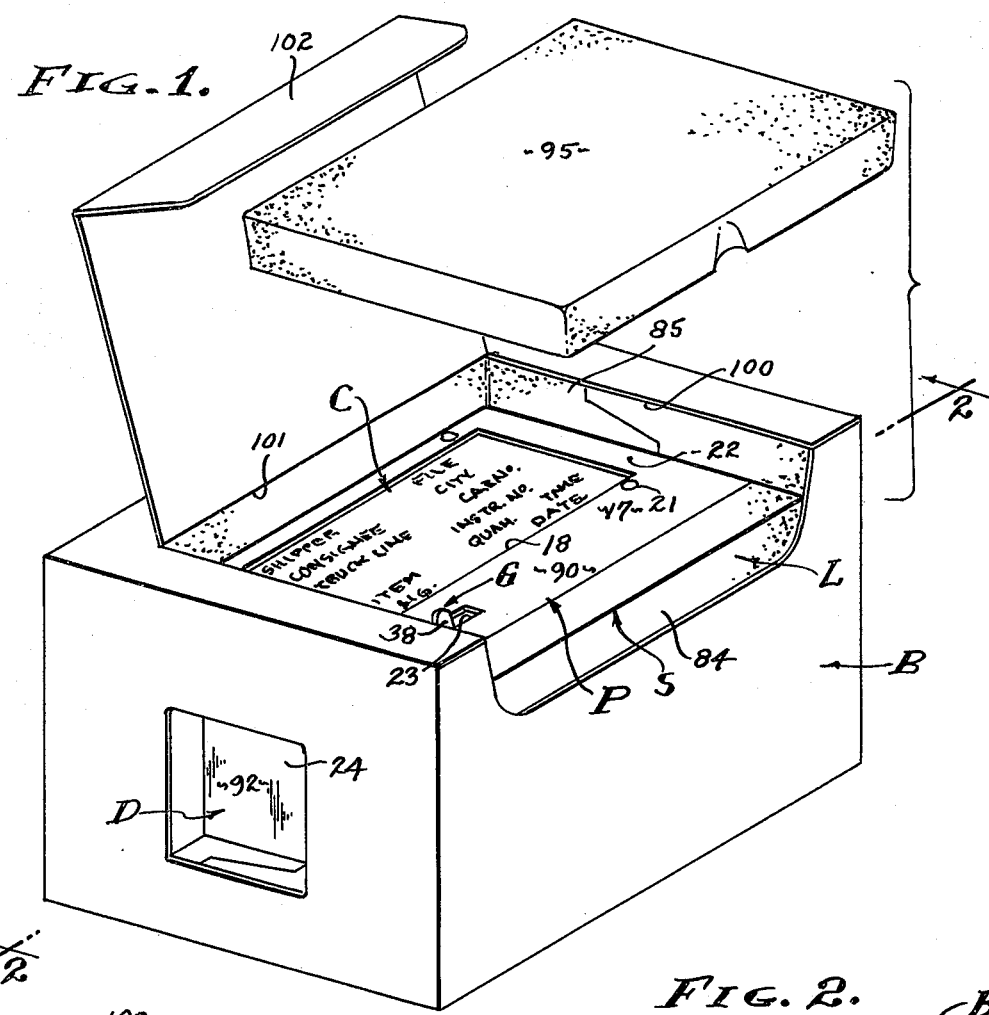
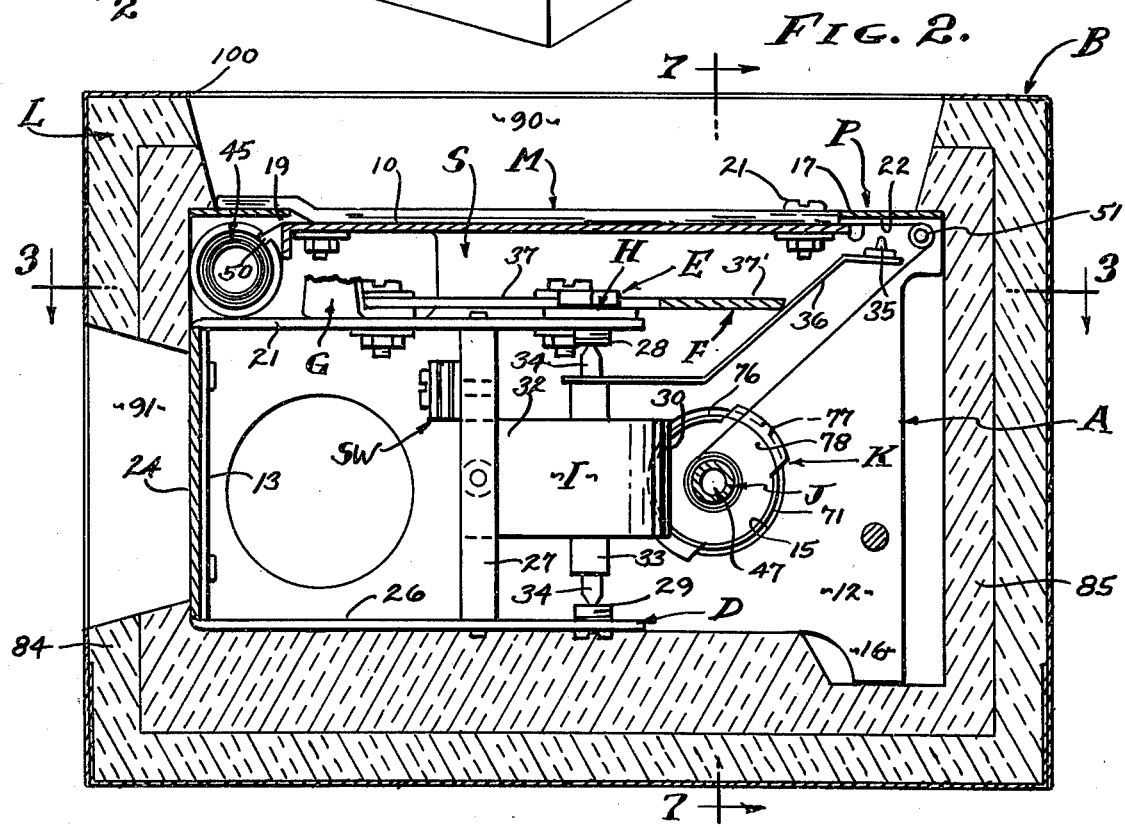

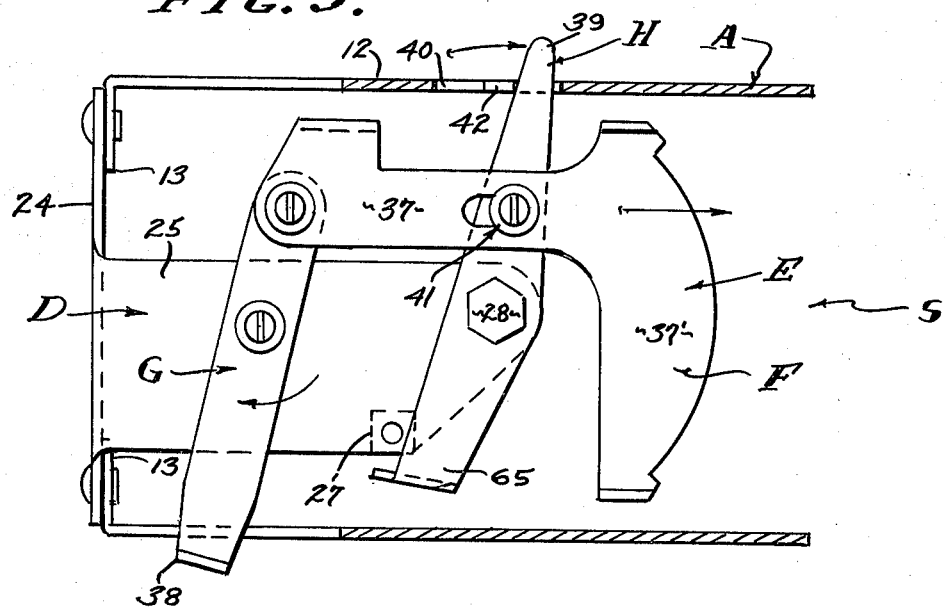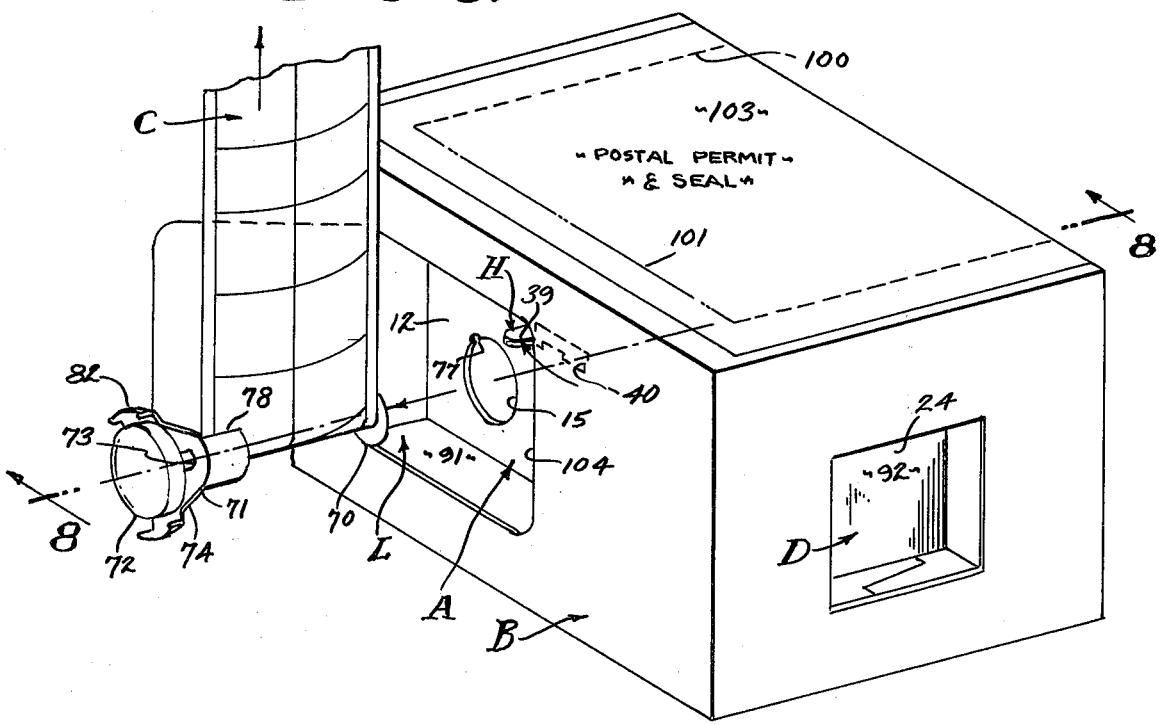

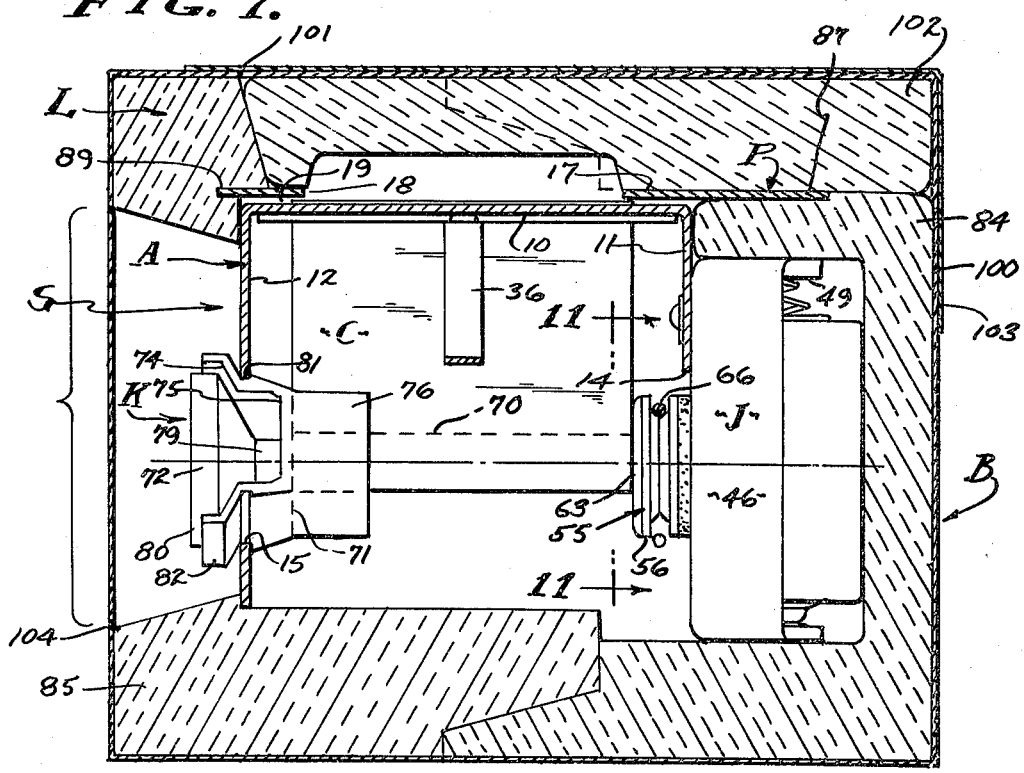
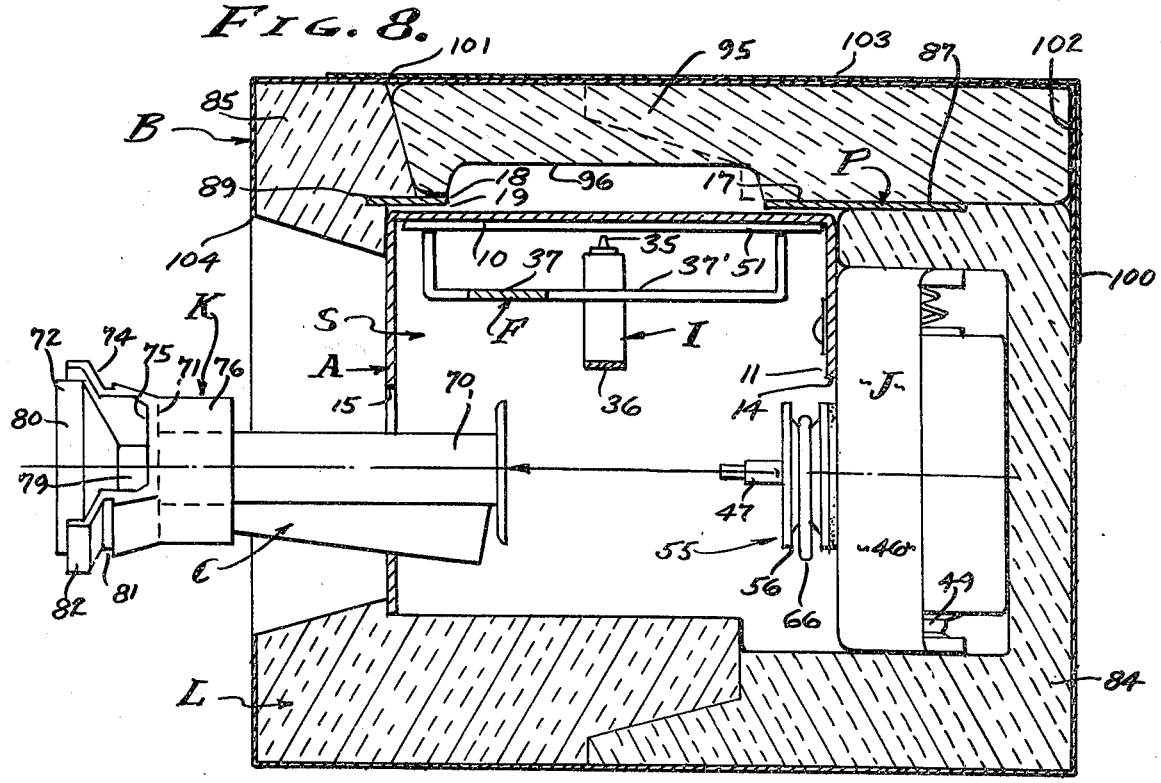

THERMOGRAPH WITH REMOVABLE CARTRIDGE

BACKGROUND

The thermograph of the present invention is a recording thermometer that produces a thermogram for the protection of shippers and receivers of perishable goods by providing a permanent history of the temperature condition throughout the time interval of transit: reference being made to my co-pending application Ser. No. 253,202 filed May 15, 1972, entitled RECORDING THERMOMETER and issued Oct. 7, 1975 as U.S. Pat. No. 3,910,119. The present invention relates to improvements in such an instrument, namely in the compactness and durability thereof, and in the logic control and protection of a chart that is extracted in a cartridge; the loaded instrument being sealed in a shipping container with separate openable areas for purposeful access by the shipper and receiver, all as hereinafter described.

Recording temperature change is of the essence, a feature obviated by the concept disclosed in application Ser. No. 253,202 but with problems yet remaining with respect to compactness and durability. Namely, there is the necessity of reliance upon Postal Service for return of the instrument from the receivers, in order for the instrument to be reconditioned for use by subsequent shippers, and there is the severe punishment to which the instruments are subjected when in the return mail. Because of high and increasing postal rates, weight is a prime factor which dictates a light construction, preferably of 1 pound or less. And heretofore, corrugated cartons of multi-wall design have been employed for protection in the mails, but without complete success. Therefore, it is an object of this invention to retain light weight with heavier construction in a more compact embodiment, and it is also an object to provide an impact absorbent liner that supports the instrument per se within a box without resort to a multilayer corrugated container. With the present invention, the idea of means resides in an instrument-liner-box concept; a sensible instrument that is pre-loaded and encased within a reuseable liner and sealed within an expendible box characterized by separately openable access doors. Instead of the mechanism being protectively carried entirely within a frame, the clock motor in particular is now carried at the exterior of the frame and within the liner, for its protection. Consequently, a frame of durable short coupled construction and of light weight becomes feasible.

Temperature isolation as a result of enclosure within a box or liner cannot be tolerated when the primary objective is timely response to temperature change. Therefore, it is an object of this invention to provide direct response to surrounding temperature despite the encasement by the insulating liner; there being a heat sink that is exposed to the surrounding environment through both the liner and enveloping box.

The instrument and shipping container concept of application Ser. No. 253,202 is characterized by a hinged top or cover that is opened and closed by both the shipper and the receiver, removal of pull pin used to initiate operation by the shipper, and by withdrawal of the chart and/or operation of a stop button used by the receiver to terminate operation; all features being exposed within one openable recess and inviting confusion by being accessible to both the shipper and receiver. It is an object, however, of the present invention to avoid confusion by providing separate and individual access to each person concerned, while the enclosure of the instrument remains intact. In other words, this instrument and liner remain enveloped within the box that is sealed thereover as a container, the box having one access opening for the exclusive employment by the shipper, and having another access opening for the exclusive employment by the receiver. With the present invention, each of said access openings is openable and resealable once with warranty, the features of the instrument as related to the shipper and receiver being exposed separately thereby.

It is an object of this invention to provide logic controls for an instrument of the character thus far referred to, with access by the shipper to record information (with copy) and to start the instrument and with access by the receiver to withdraw the record and to stop the instrument. With the present invention, there is a prepared chart accessible to the shipper through said one access opening exposing a start lever and directives for its operation, and there is the recorded chart accessability for the receiver through the said other access opening exposing a stop lever and directives for its operation. In accordance with this invention, I provide coordinated lever means associating the start and stop levers in the one instance to depress a stylus and release or energize a drive; and in the other instance to retract the stylus, stop or deenergize the drive and release the recorded chart for its extraction.

The preloading of a thermograph of the type under consideration normally results in stylus engagement against an immoveable chart during shelf-life of the instrument awaiting use. It has been found that this subjection is detrimental as it may cause a cut in the chart and subsequent tearing when the chart progresses. Therefore, it is an object to provide means for affecting the aforementioned depressing and lifting of the stylus, and all of which is coordinated with the starting and stopping of the instrument. With the present invention, an actuator is provided for predetermined positioning by the start and stop levers, the latter being reserved for release of the recorded chart, as will be described.

The extraction of the recorded chart presents problems that it is long and narrow and of frangible character. In practice, a spool partially draws up the recorded chart and it is an object of this invention to provide cartridge means facilitating completion of winding the chart onto the spool, prior to extraction thereof for inspection by the receiver.

SUMMARY OF THE INVENTION

The thermograph of the present invention is a preloaded instrument involving a frame that provides a table over and upon which a pressure sensitive chart is transported and exposed through a face plate for receiving written information, the face plate providing a platen under which the chart moves to be engaged by a stylus that is positioned by thermometer means carried by a subframe which is exposed directly to the exterior environment. The operation and protection concept involved with this instrument is the instrument-liner-box combination, and also the start lever-actuator-stop lever logic means, as will now be described.

DRAWINGS

The various objects and features of this invention will be fully understood from the following detailed description of the typical preferred form and application thereof, throughout which description reference is made to the accompanying drawings, in which:

FIG. 1 is a perspective view of the thermograph, showig it from the front and opened preparatory to use.

FIG. 2 is a longitudinal sectional view taken as indicated by line 2—2 on FIG. 1.

FIG. 5 is a view similar to FIGS. 3 and 4 showing the stopped and/or return condition of the logic means.

FIG. 6 is a rear perspective view similar to FIG. 1 showing the thermograph as sealed by the shipper and opened from the back by the receiver with the chart removed.

FIG. 7 is a transverse sectional view taken as indicated by line 7—7 on FIG. 2.

FIG. 8 is a transverse sectional view taken as indicated by line 8—8 on FIG. 6.

PREFERRED EMBODIMENT

The recording thermometer herein disclosed is a thermograph that impresses a record upon a pressure sensitive chart C paper, thereby providing a thermogram to be extracted as shown in FIG. 6. The instrument S portion of this invention is permanent, reuseable and it involves a renewable prepackaging concept comprising a protective liner L and an expendible box B. The chart C is expendible each time the instrument is used and a new chart is installed for each use of the instrument in producing a time temperature record. The instrument S is a light weight fabrication of metals which involves, generally, a frame A, a face plate P, a subframe D, a logic means E comprised of an actuator F, start lever G and stop lever H, a thermometer I, drive means J and removeable cartridge means K. The protective liner L is a low density embracement of the entire instrument, and the box B is an enclosure therefor which embodies all of the features necessary for delivery to the concerned people involved; for use initial by the shipper, for transport use as by the carrier of the perishables to be protested, for access and extraction of the chart recording by the receiver, and for return by the Postal Service. Having served all of these aforementioned functions, the box is replaced when preparing the instrument S anew.

Figure 4:
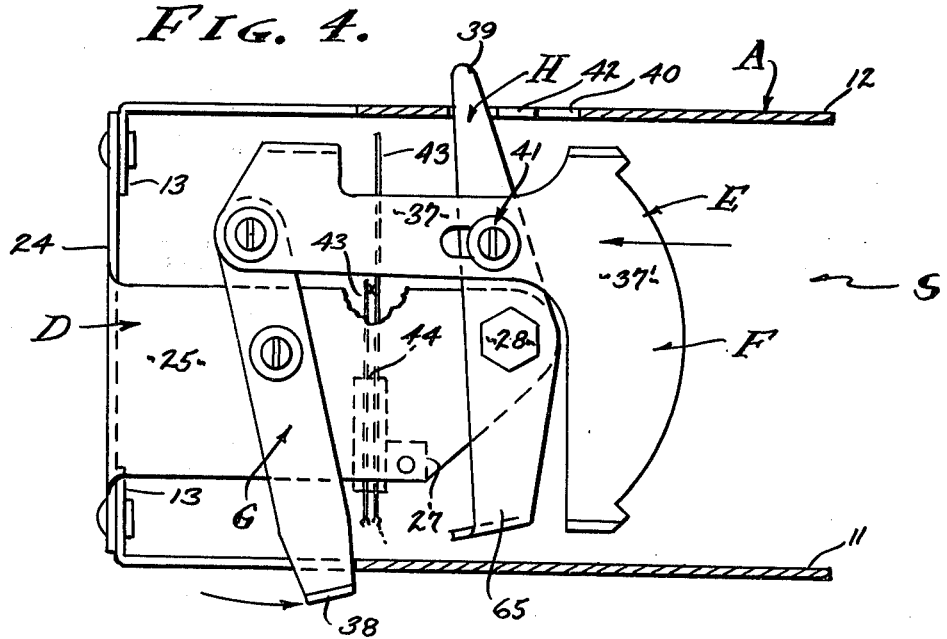
FIG. 4 is a view similar to FIG. 3 showing the started and running condition of the logic means.
Figure 9:
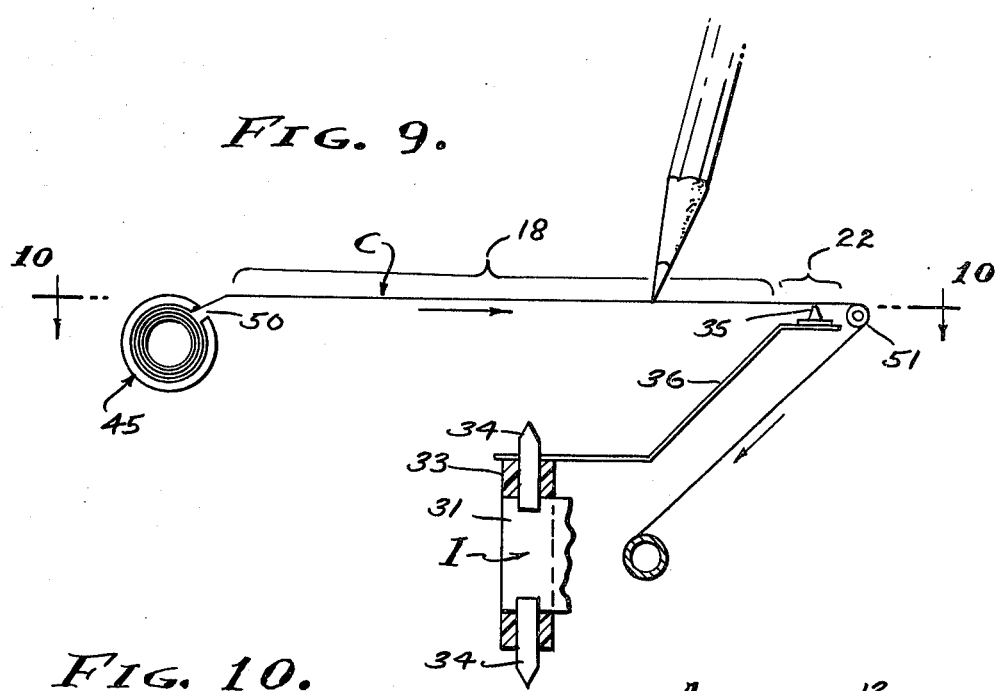
FIG. 9 is a fragmentary view taken longitudinally of the recording thermograph and showing the essential elements thereof and their relationship to the chart that is transported therethrough, the application of a writing instrument being shown.
Figure 10:
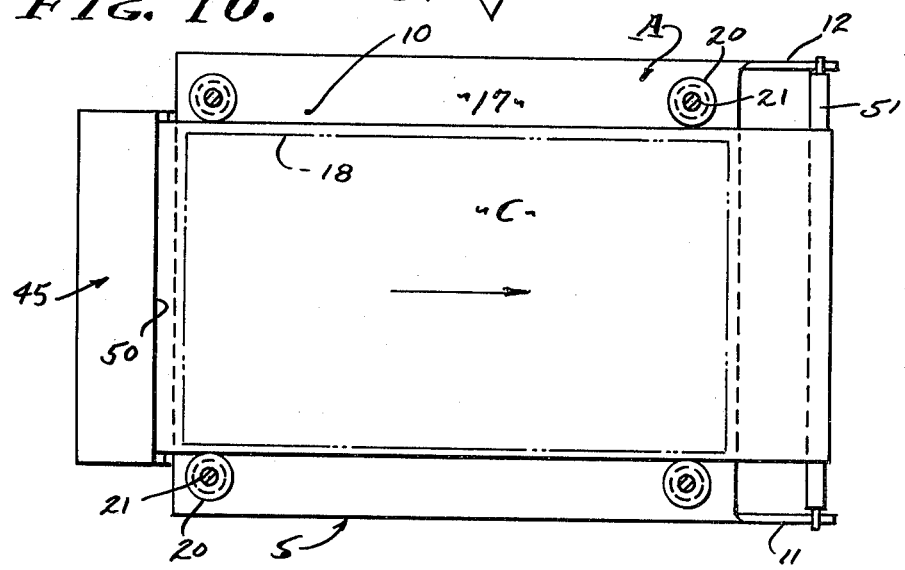
FIG. 10 is a plan view taken as indicated by line 10—10 on FIG. 9.

The frame A is preferably a sheet metal part that is die cut and formed to have a table 10 (see FIG. 2) with a pair of depending parallel sides 11 and 12 (see FIGS. 7–8), there being inwardly turned flanges 13 disposed normal to the table at one end of the frame (see FIG. 4). Thus, the frame is generally of U-shaped cross section and characterized by aligned openings 14 and 15 at the opposite front and back sides 11 and 12, and located at the far end of the frame away from said flanges. As shown, the flanges 13 provide for cantilevered support of the subframe D and the openings 14 and 15 provide for accommodation of the drive means J and cooperative installation and removal of cartridge K. In practice, the table 10 stops short of each end of the frame, at the flanged end so as to provide space for a chart supply, and at the opposite end so as to provide stylus access to the platen portion of the face plate P. The frame is provided with corner legs 16, which taken together with the clock motor drive of means J provides a stable support engageable upon a horizontal surface.

The face plate P is preferably a sheet metal part die cut so as to present a desk top 17 (see FIGS. 1–2) with an aperture 18 through which a person can write upon the table top 10, and spaced from said table top so as to establish a chart passage 19. The face plate P is a planar element secured to the frame in spaced parallel relation thereto by longitudinally separated pairs of transversely spaced chart guides 20 through which fasteners 21 extend as shown. The inner perimeter of the aperture 18 is inward of the outer perimeter of the frame table 10, and presents a planar writing surface to back up the manifold M and writing upon the top or back side of the chart C. The outer perimeter of the face plate is rectangular and coextensively overlies the frame, and it extends beyond said opposite end of the table 10 to form the platen 22, there being a start opening 23 toward what I will term the front left portion thereof in the form of an elongated slot.

Figure 3:
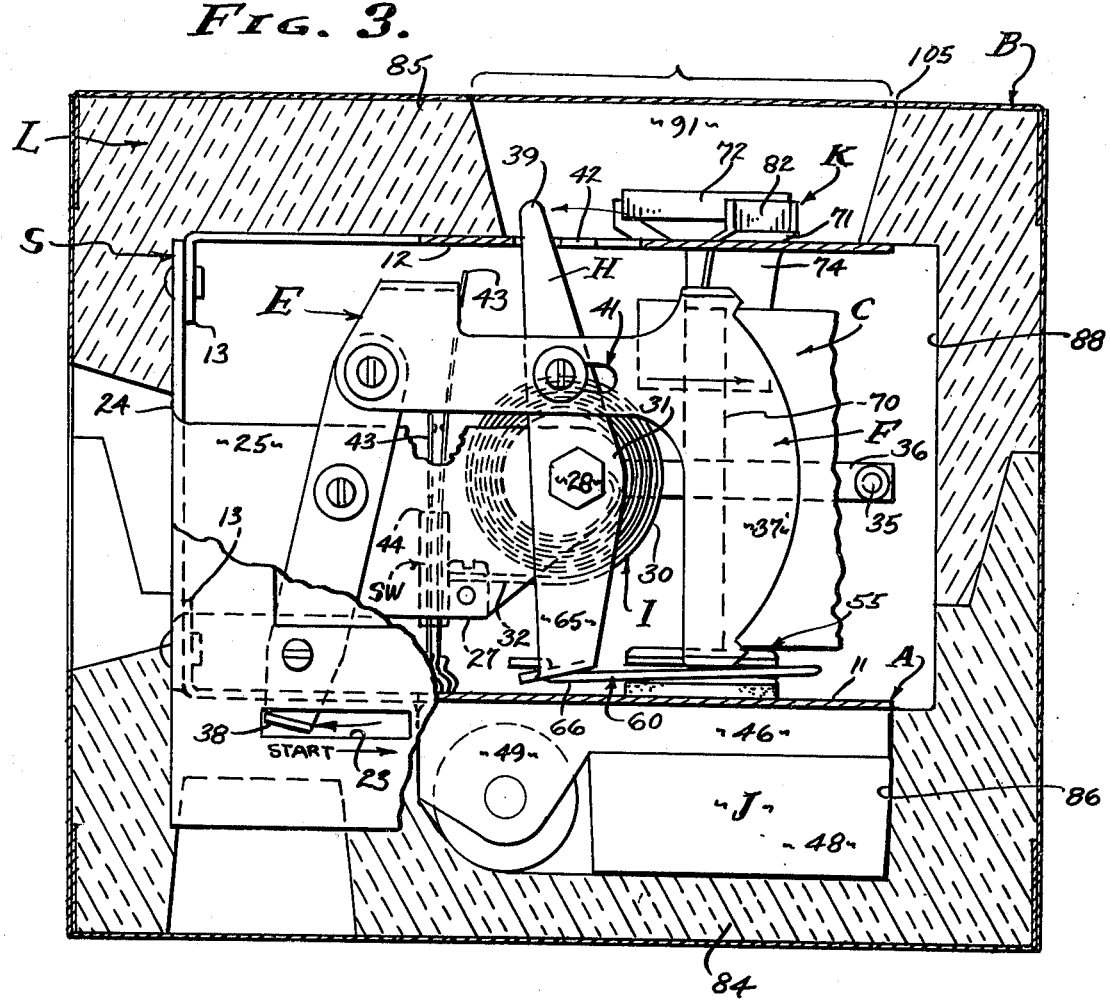
FIG. 3 is a plan section taken as indicated by line 3—3 on FIG. 2, showing the prepared condition of the instrument and its logic means.

The subframe D, as illustrated in FIGS. 2 and 3 and like the frame A, is preferably a sheet metal part that is die dut and formed to be cantilevered from the frame flanges 13, and adapted to carry the logic means E with its actuator and levers and also carry the thermometer I. As shown, the subframe D comprises a base 24 and a pair of upper and lower arms 25 and 26 extending therefrom to support the means E etc, and means I within the confines of the frame. The base 24 is a planar element secured by fasteners to the flanges 13 and disposed in a plane normal to the table 10, and it presents one end of the instrument and which I will term the heat sink. The arms 25 and 26 are planar elements spaced parallel to each other and to the table top 10, and they are held in said spaced relation by mounting post 27 disposed therebetween and fastened thereto respectively by screw fasteners as shown. The terminal ends of the two arms are at the proximate center of the frame and carry axially adjustable bearings 28 and 29 disposed on an axis at the center of the chart passage 19 and normal to the table top 10. In practice, the mounting post 27 is laterally offset from the bearing axis and toward the front left portion of the frame. As will be described, the mounting post 27 anchors the thermometer I and carries a switch SW of the logic means, while the arm 25 carries the levers G and H of the logic means.

The thermometer I as it is illustrated in FIGS. 2 and 3 is a spiral bimetal coil 30 of convolute form having a live center end 31 and an anchored peripheral or outer end 32. The bimetal 30 is a lamination of two metals having relatively high and low coefficience of expansion, the laminations being joined together at their interfaces with the low expansive material at the inside and the high expansive material at the outside of the spiral. The live center end 31 is notched at its opposite margins and the live mounting thereof comprises an elongated hub 33 with a transverse slot diametrically therethrough to receive the end 31. The opposite ends of the hub 33 are bored to receive bearing pins 34 which are pressed therein to enter the notches in the coil end, thereby locating the pins 34 while locking the bimetal coil onto the hub. The bearing pins 34 are cone pointed so as to establish needle bearings when fitted into complementary tapered holes in the two bearings 28 and 29 which are accordingly adjusted for free turning of the hub 33. The anchored peripheral end 32 of the spiral bimetal coil is fixed to the mounting post 27, thereby to have direct metallic conductivity of heat to and from the heat sink base 24 of the subframe D. In accordance with this invention, recording means is provided in the form of a stylus 35 biased against the platen 22 by a spring arm 36 that is carried by the hub 33. As shown, the arm 36 extends laterally from the hub axis and upwardly at an acute incline toward the platen 22 where the stylus 35 projects upwardly therefrom to engage upon the interposed chart C transported beneath said platen.

The start lever G and stop lever H is each a first class lever, as shown in FIGS. 4 and 5, that turns about a vertical axis bearing through the subframe arm 25, and through a limited arc so as to extend transversely of the frame beneath the table 10. The pivoted bearing axes are more or less centered in the frame, with what I will term their back ends pivotally carrying the actuator F, thereby forming a variable trapezoid or the like. The actuator F has a leg 37 that extends longitudinally, and it has a transversely disposed arcuate stylus lifter 37' at its active end beneath the arm 36 and concentric therewith when in an extended lifting position. The forward end of the start lever G has a manually engageable member 38 projected upwardly through the opening 23 in the face plate, whereby this lever and the actuator are positionable to extend the actuator beneath the stylus arm 36 to lift the same. The back end of the stop lever H has a manually engageable member 39 projected laterally through an opening 40 in the back side 12 of the frame, whereby the stop lever and actuator are positionable to extend the actuator as above described. Further, each opening 23 and 40 is extended to the right and left respectively (bearing at the front and back of the frame respectively) wherein the two levers may be simultaneously positioned by movement of member 39 to the left (see FIGS. 5-6) to retract the actuator and release the stylus.

A feature of this logic system is the lost motion means 41 at the pivot between stop lever H and the actuator F, whereby the stop lever may be preset in an active of running position (see FIG. 4). In practice, the actuator leg 37 is slotted for this purpose, one end of the slot being engaged by a pivot pin means 41 to subsequently move the actuator F into the extended stylus lifting position (see FIG. 5) when the stop lever member 39 is shifted to the left (see FIG. 5-6) from said preset position. As shown, the member 39 of stop lever H is lifted over a step 42 which normally holds it in said preset position.

In accordance with this invention there is the controlling switch SW that is actuated by the logic means E to open and close an energizing circuit to the clock motor of drive means J. As shown in FIG. 3, the switch comprises a pair of disengageable leaves 43 separated by an insulator 44 and one of which is normally engaged by the other end separated when the actuator is moved to said extended stylus lifting position. It will be seen that the start lever G establishes the "off" position independently of the stop lever H which remains preset in the "on" position as shown in FIG. 3. It will then be seen that the start lever G establishes the on position independently of the stop lever H when moved as shown in FIG. 4. However, it will also be seen that the stop lever H reestablishes said off position when moved as shown in FIG. 5 thereby shifting the actuator F to open switch SW as described.

The drive means J as shown in FIG. 3 is a battery energized prime mover that transports the chart C paper from a supply means 45 and into the cartridge means K. The drive means J can vary in its internal design and it involves generally a body 46 of three dimensional rectangular configuration that is mounted to the frame front side 11 and a drive shaft 47 that projects through the opening 14 therein in alignment with the opening 15 in the back side 12. In practice, a commercially available clock movement is remanufactured for this purpose, by removing the customary mounting tube (not shown) from the front face of the body 46 and thereby providing a substantially large diameter hole therein. Clock movements of the type under consideration have coaxial minute and hour shafts, the latter being a tubular shaft 47 journaled over the former. It will be understood that the shaft 47 revolves one revolution in a 12 hour period during operation of the clock movement. As shown, the body 46 involves a case 48 for enclosing the clock movement and a battery clip recess 49 to one side and opening opposite from the clock front which is secured flat against the frame side 11. In practice, embossments are provided to project from the side 11 and enter into recesses in the clock body 46 to locate the same, there being screw fasteners passed through the frame and into the clock to secure it in working position (see FIGS. 7-8). The battery circuit of the clock drive is in series through the switch SW, mounted as shown in FIGS. 2 and 3, so that closing of the switch as shown in FIG. 4 energizes the drive means J, and vice versa. The drive axis is normal to the sides 11 and 12 and parallel to the table top 10.

In accordance with this invention the supply means 45 is adapted to deliver a strip of pressure sensitive chart C paper through the passage 19 and engaged between the chart guides 20. To this end there is a cassette occupying the aforesaid space therefor at one end of the frame A, as best illustrated in FIG. 2, the cassette being a tubular right cylinder having a longitudinally disposed feed slot 50 at one side for the discharge of the chart. In practice, the strip of chart C paper is spindled and free to pull from the interior of the cassette cylinder. At the remote end of the frame A there is a transverse guide roller 51 free to turn and over which the chart C paper is trained so as to be turned into the direction of the drive means axis and into the cartridge means K.

A feature of this invention is the clutch means (see FIGS. 11-12) 55 which permits forward turning of the cartridge means K independently of the rotation of the clock drive shaft 47. Although this clutch can be an overrunning clutch or a ratchet type clutch, it is preferred to be a disengageable clutch for positive drive or release, and to this end includes a drive flange 56, a clutch member 57, a spring 58 and seat 59, and also a manual release means 60 actuated by the logic means E. The drive flange 56 of the clutch means 55 is fixed onto the drive shaft 47 and has one or more drive openings 61 alignable with one or more complementary drive openings in the spool flange 63 of the cartridge. The clutch member 57 is axially shiftable on a tubular extension of the flange 56 and carries one or more drive pins 64 that project through flanges 56 and 63 when the two said flanges are coaxially and adjacently related. The spring 58 is a disc of resilient elastomeric or foamed plastic material such as polyethylene that presses the flange 56 toward the flange 63 so as to project the pins 64, the seat 59 being fixed onto said extension of the drive flange to back up the spring 58.

Figures 11, 12:
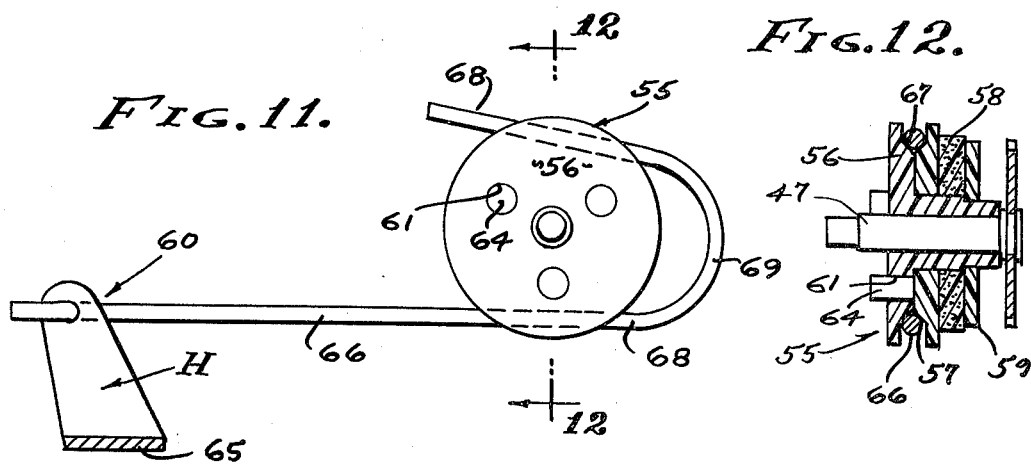
FIG. 11 is an enlarged fragmentary view taken as indicated by line 11—11 on FIG. 7.
FIG. 12 is a detailed sectional view taken as indicated by line 12—12 on FIG. 11.

The release means 60 comprises a forward arm 65 of the step lever H that reciprocates a release rod 66 which separates the flanges 63 and 56 (see FIG. 11), the said flanges having inclined perimeters 67 that face together forming a V channel to receive said release rod (see FIG. 12). The release rod 66 is of a thickness, preferably round in cross section, so as to be drawn between the flanges 63 and 56 thereby withdrawing the pins 64 from the flange 63 when separation occurs. The release rod 66 has a hooked end portion that embraces the clutch means 55 and has divergent legs 68 that ride freely between the inclined perimeters 67 of the separable flanges 63 and 56. The divergent legs 68 are joined by a semi-circular portion 69 that rides between the flanges when the top lever H is shifted to draw the legs 68 so as to cause the flange separation and consequent withdrawal of pins 64 from flange 63. As shown, the release rod 66 has a joggled end engageably locked through an ear depending from the lever arm 65 in alignment with the said V channel. The drive shaft 47 projects from this clutch assembly to receive the cartridge spool which is free to rotate thereon.

The removeable cartridge means K, as best illustrated in FIGS. 6-8, a take-up reel rotated forwardly by the drive means J through the releasable clutch means 55 above described. The primary purpose of this cartridge means is its removability with the chart C paper rolled thereon. Since the duration of transport in an unknown varying from a day or two to several weeks or more, the length of the unused chart C paper behind the stylus and remaining in the cassette will vary; and it is this remainder of unused chart C paper that is to be wound into the cartridge before its removal. And, to this end I provide the cartridge means K that is operable on the axis of the drive means J and removeable therefrom through the opening 15 in the back side 12 of the frame A. As shown, the cartridge means K involves a spool 70, a bearing 71 and a knob 72, all of which are assembled as a unit adapted to be inserted through the opening 15 and coupled to the clutch means 55. The aforementioned flange 63 is provided at the inner end of the spool 70, integral therewith, the spool being a right cylinder of tube form with a bearing opening 73 adapted to be centered on and rotatable freely upon the drive shaft 47 that projects from the clutch means 55. The bearing 71 is releasably supported in the frame opening 15 and comprises a pair of manually depressible supports 74 that enter through the opening 15 to carry a plate 75 normal to the rotational axis and in alignment with the proximate edge of the chart C paper that is taped to and wound onto the spool 70.

Plate 75 is disc shaped and of smaller diameter than the opening 15 and carries a peripheral wall 76 of cylinder form that extends inwardly therefrom to overlie a portion of the spool 70. The bearing 71 is keyed to the frame at 77 and the wall 76 is slotted at 78 to receive the chart C paper. The knob 72 has a shaft 79 that is journaled through the center of plate 75 and has a wheel 80 exposed at the exterior of the frame A. The supports 74 are channeled at 81 to be captured by the frame opening 15, there being extensions 82 of the supports, diametrically opposite, that overlie the perimeter of wheel 80 to be depressed for release of the channels 81 from the frame. Thus, the cartridge means K is snapped into and out of position, being locked in aligned working position by the manually depressible suppots 74.

A feature of the present invention is the provision of the business manifold M, as shown in FIG. 2, which provides multicopies including copy onto the back of the chart C paper which is subsequently processed into the thermogram. The manifold M receives the written information associated with the shipment and which is transferred thereby onto the chart and after which the manifold copies are removed, the instrument started and the box sealed as later described. In practice, the manifold M comprises one original and three carbon copies, the last copy being the back of the chart. The chart C paper being pressure sensitive records a mirror opposite image on its front side, which can be used as a verification to guard against alterations. The shipping information written through the manifold and onto the chart can include the names of the shipper and the receiver or cosignee, the carrier or trunkline, the file number, the car number, the destination, the item shipped, the quantity, the time and date of departure, and the signature of the responsible party. As shown, the manifold M is rectangular and fits snugly within the confines of the aperture 18 and with its left margin overlying the face plate.

The protective liner L is a fitted pair of complementary bodies, as shown in FIGS. 3, 7 and 8, of low density material that is depressible and adapted to absorb shock and to withstand crushing loads without deforming the frame and other exposed parts of the instrument. A feature of the liner L is that it establishes the dimensional configuration of the completed instrument package while mounting the instrument S therein. In its preferred form, the liner L comprises front and back sections 84 and 85 which are telescopically joined at the center plane of the instrument.

The front section 84 is recessed to have an interior configuration 86 complementary to and fittedly receiving the exterior configuration of the front portion of the instrument S and all of its exposed means etc. For example, the front wall of the liner L embraces the clock movement case 48 and the outwardly exposed exterior of the battery, and the front wall thereof also fits flat against the front side 11. Additionally, the top and bottom and side walls of this liner section supportably engage the sides and legs and face plate P, the face plate being keyed into the shoulders and/or slots 87 at its edges.

The back section 85 is recessed to have an internal configuration 88 complementary to and fittedly receiving the exterior configuration of the back portion of the instrument S and all of its exposed means etc. For example, the back wall of the liner embraces the back side 12 of the frame having flat engagement therewith.

Additionally, the top and bottom and side walls of this liner section supportably engage the sides and legs and face plate P, the face plate being keyed into shoulders and/or slots 89 at its edges. In carrying out this invention, the liner L is made of polystyrene of 1.5 lbs. density per cu. ft. and has a nominal wall thickness pf ¾ inch surrounding the instrument.

The liner L hereinabove described is characterized by several openings, one opening 90 for accommodation of the shipper, one opening 91 for accommodation of the receiver, and one opening 92 for exposure of the heat sink end of the frame-subframe. The opening 90 is a top opening which involves the substantial removal of the coplanar top walls of both sections 84 and 85 leaving the back and side walls to their full height, but reducing the front wall to the height of the face plate P, thereby presenting a desk formation adapted to a persons hand when writing upon the manifold M and underlying back of the chart C paper. The opening 90 also exposes the start member 38 of the logic means E.

The opening 91 is a back opening which involves an aperture through the back wall of section 85, in alignment with and overlying the area of side 12 through which the cartridge means K is exposed at the exterior of the frame. The opening 91 also exposes the stop member 39 of logic means E.

The opening 92 is an end opening which involves an aperture formed through the complementary overlapped edges of the frame sectons 84 and 85 and overlying the center area of the base 24 of subframe D, thereby exposing the subframe to the surrounding air temperature for heat absorption into and from the subframe and bimetal thermometer anchored thereto as hereinabove described.

The aforementioned opening 90 is quite expansive and accordingly a filler 95 is provided, as best illustrated in FIG. 1, to reoccupy the space thereof for protection of the chart C paper that is exposed through aperture 18. To this end the filler 95 is a solid member of the same material used in the formation of the liner L, fitted into the opening 90 and with relief at 96 to clear the aperture 18 and the projecting start member 38. The filler 95 is removeably installed when pre-packaging the instrument, to be removed and reinstalled by the shipper.

The expendible box B is a wrap around enclosure, as shown throughout the drawings, that captures the liner L in its embracement over the instrument S, and it comprises front, back, top, bottom and end walls complementary to the corresponding walls of the aforementioned liner. As shown, the top and front walls of the box are perforated along a line 100 corresponding to the shape of the opening 90, with a hinge crease 101 at the rear of the opening and a tongue 102 depending below the plane of the face plate to overlie the liner. As best illustrated in FIG. 6, a warranty seal 103 including a Postal Service permit printed thereon overlies the door are thus formed by the lines 100 and tongue 102, thereby to seal the package for shipment by the carrier. The back wall of the box is perforated along a line 104 corresponding to the shape of the opening 91, with a hinge crease 105 to one side thereof and with its remaining three margins overlapping the liner L. Any suitable tape or the like can be used to reseal this door area. Lastly, the one end wall of the box is cut and a portion removed along a line corresponding to the opening 92 in the complementary sections 84 and 85 thereby establishing a permanent window area therein for heat adsorption through the subframe D.

From the foregoing it will be seen that I have provided an improved and durable thermograph that serves the purposes of all those persons involved. The instrument S is prepared, loaded with the chart C paper and packaged at a laboratory where all of its functions are predetermined. The pre-packaged instrument remains sealed in the box B as it is delivered to the shipper who enters opening 90 through the perforated top and front of the box. The shipper fills in the manifold information and then moves the start member 38 to the on position before replacing the filler 95 and closing the box with the warranty seal 103. The instrument S is then in operation and is placed in the load to be protected where it responds to the surrounding air temperature by absorption of heat through the subframe base 24. At the destination of the carrier, the instrument is removed from the load by the receiver who enters opening 91 through the perforated back of the box. The receiver moves the stop member 39 to the off position and winds the full chart C paper into the cartridge and removes the same from the instrument S, after which the receiver withdraws the thermogram from the cartridge for a reading. The thermogram produces a time temperature recording in the form of a line impressed permanently upon the chart. Subsequent to its usefulness, the self-sufficient pre-packaged instrument is then returned via Postal Service to the laboratory for reloading and subsequent reuse.

Having described only a typical preferred form and application of my invention, I do not wish to be limited or restricted to the specific details herein set forth, but wish to reserve to myself any modifications or variations that may appear to those skilled in the art:

Having described my invention, I claim:

1. A thermograph including in combination; an instrument supporting a thermometer means with a stylus positioned in response to temperature and normally pressed into engagement against a removable strip chart, drive means for said strip chart, said instrument adapted to be pre set and loaded with said removable strip chart for time-temperature recording and having means exposing the chart to be written upon and having means for manipulated control by a shipper and receiver respectively and having an on condition for transporting the chart when engaged by the stylus and having an off condition, and logic means having an actuator shiftable from an on position to an off position for off conditioning the drive means and lifting the stylus from the chart and having a frictionally positionable start lever shifting the actuator into the on condition of the drive means and having a releasable stop lever shifting the actuator into the off condition of the drive means, a liner of depressible low density material having walls of substantial thickness protectively embracing the instrument and having separate access openings to the exposed chart and start lever and to the removable strip chart and stop lever respectively, and a box permanently enveloping the liner when the combination is prepared for use and having separate reclosable doors coextensive with the aforesaid separate access openings in the liner for independent use by the shipper and receiver to write upon the chart and start the instrument and to stop the instrument and remove the chart respectively.

2. The thermograph as set forth in claim 1 wherein there is a lost motion means between the stop lever and actuator and the stop lever being preset in an on condition subject to subsequent release to said off condition.

3. The thermograph as set forth in claim 1 wherein there is a slotted engagement of the stop lever and actuator and the stop lever being engageable to move the actuator in the on condition to the off condition.

* * * * *